US012319057B2

(12) United States Patent
Hayashi

(10) Patent No.: US 12,319,057 B2
(45) Date of Patent: Jun. 3, 2025

(54) LIQUID EJECTING APPARATUS

(71) Applicant: SEIKO EPSON CORPORATION, Tokyo (JP)

(72) Inventor: Tadashi Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 219 days.

(21) Appl. No.: 18/192,271

(22) Filed: Mar. 29, 2023

(65) Prior Publication Data

US 2023/0311494 A1 Oct. 5, 2023

(30) Foreign Application Priority Data

Mar. 31, 2022 (JP) ................................ 2022-058935

(51) Int. Cl.
*B41J 2/045* (2006.01)

(52) U.S. Cl.
CPC ....... *B41J 2/04588* (2013.01); *B41J 2/04541* (2013.01); *B41J 2/04546* (2013.01); *B41J 2/04581* (2013.01)

(58) Field of Classification Search
CPC ................ B41J 2/04588; B41J 2/04541; B41J 2/04546; B41J 2/04581
See application file for complete search history.

(56) References Cited

U.S. PATENT DOCUMENTS

| | | | | |
|---|---|---|---|---|
| 7,859,555 | B2 * | 12/2010 | Kasai | G06K 15/1247 347/130 |
| 2011/0012948 | A1 * | 1/2011 | Kurashina | B41J 2/04541 347/10 |
| 2014/0267479 | A1 | 9/2014 | Yamamoto | |
| 2018/0272700 | A1 * | 9/2018 | Ito | B41J 2/04541 |

FOREIGN PATENT DOCUMENTS

| | | |
|---|---|---|
| JP | 2017-185822 A | 10/2017 |

* cited by examiner

*Primary Examiner* — Lam S Nguyen
(74) *Attorney, Agent, or Firm* — Global IP Counselors, LLP

(57) ABSTRACT

A liquid ejecting apparatus includes a control circuit substrate that outputs a head control signal for use in controlling an ejection head to a head circuit substrate. The control circuit substrate includes a first buffer circuit having a first buffer and a second buffer. The first buffer circuit can simultaneously write first image data contained in the base image data signal into the first buffer and read second image data contained in the base image data signal from the second buffer. The first buffer circuit writes the first image data into the first buffer at a first frequency and reads the first image data from the first buffer at a second frequency, which is higher than the first frequency. The first buffer circuit writes the second image data into the second buffer at the first frequency and reads the second image data from the second buffer at the second frequency.

8 Claims, 7 Drawing Sheets

| [SIH, SIL] | | [1, 1] (LD) | [1, 0] (MD) | [0, 1] (SD) | [0, 0] (ND) |
|---|---|---|---|---|---|
| S1 | T1 | H | H | H | L |
| | T2 | H | L | L | L |
| S2 | T1 | L | L | L | H |
| | T2 | L | H | L | L |

LIQUID EJECTING APPARATUS

The present application is based on, and claims priority from JP Application Serial Number 2022-058935, filed Mar. 31, 2022, the disclosure of which is hereby incorporated by reference herein in its entirety.

BACKGROUND

1. Technical Field

The present disclosure relates to liquid ejecting apparatuses.

2. Related Art

Liquid ejecting apparatuses are configured to form an image on a medium by discharging liquid onto the medium. More specifically, to form a desired image on a medium, a liquid ejecting apparatus controls the drive timings of the drive elements in such a way that the liquid is discharged onto the medium at predetermined timings. On the other hand, with a growing demand for high-quality images formed on media, an increasing number of nozzles are provided in a liquid ejecting apparatus. Also, an increasing number of drive elements are provided in relation to the respective nozzles. As a result, large volumes of signals are transmitted in a liquid ejecting apparatus.

JP-A-2017-185822 discloses a liquid ejecting apparatus that can stably discharge ink with large volumes of signals transmitted therein. In this liquid ejecting apparatus, a control unit converts a plurality of signals transmitted therein into a low voltage signalizing (LVDS) signal and then supplies this LVDS signal to a head unit. This configuration enables the control unit to be electrically coupled to the head unit via a small number of signal lines.

Nevertheless, to satisfy the need to form higher-quality images on media, even more nozzles and related drive elements are necessary for such liquid ejecting apparatuses. Therefore, further improvement is needed to transmit large volumes of signals in a liquid ejecting apparatus.

SUMMARY

The present disclosure is a liquid ejecting apparatus that includes: an ejection head that discharges liquid by driving a drive element to form an image on a medium; a head circuit substrate that controls the ejection head; a control circuit substrate that outputs a head control signal for use in controlling the ejection head to the head circuit substrate; and a cable that couples the head circuit substrate and the control circuit substrate. The control circuit substrate includes: a base image data output circuit that outputs a base image data signal, based on which the image is formed; a first buffer circuit that includes a first buffer and a second buffer, the first buffer circuit being configured to simultaneously write first image data contained in the base image data signal into the first buffer and read second image data contained in the base image data signal from the second buffer; a first buffer control circuit that controls the first buffer circuit; and a control signal output circuit that outputs the head control signal containing the second image data. The first buffer circuit writes the first image data into the first buffer at a first frequency and reads the first image data from the first buffer at a second frequency, the second frequency being higher than the first frequency. The first buffer circuit writes the second image data into the second buffer at the first frequency and reads the second image data from the second buffer at the second frequency.

DESCRIPTION OF EXEMPLARY EMBODIMENTS

Some embodiments of the present disclosure will be described below with reference to the accompanying drawings, which are to be used for the explanation. Such embodiments are not intended to unduly narrow the scope of the claims. It should be noted that not all the components that will be described below are essential to the present disclosure.

In the embodiments described below, an ink jet printer is used as an example of a liquid ejecting apparatus of the present disclosure. However, the liquid ejecting apparatus is not limited to an ink jet printer.

Alternatively, the liquid ejecting apparatus may be a color material ejecting apparatus used to manufacture color filters for liquid crystal displays (LCDs), an electrode material ejecting apparatus used to manufacture electrodes for organic electroluminescence (EL) and surface-emitting display panels, and living-body-related organic substance ejecting apparatus used to manufacture biochips.

1. Functional Configuration of Liquid Ejecting Apparatus

Figure 1:
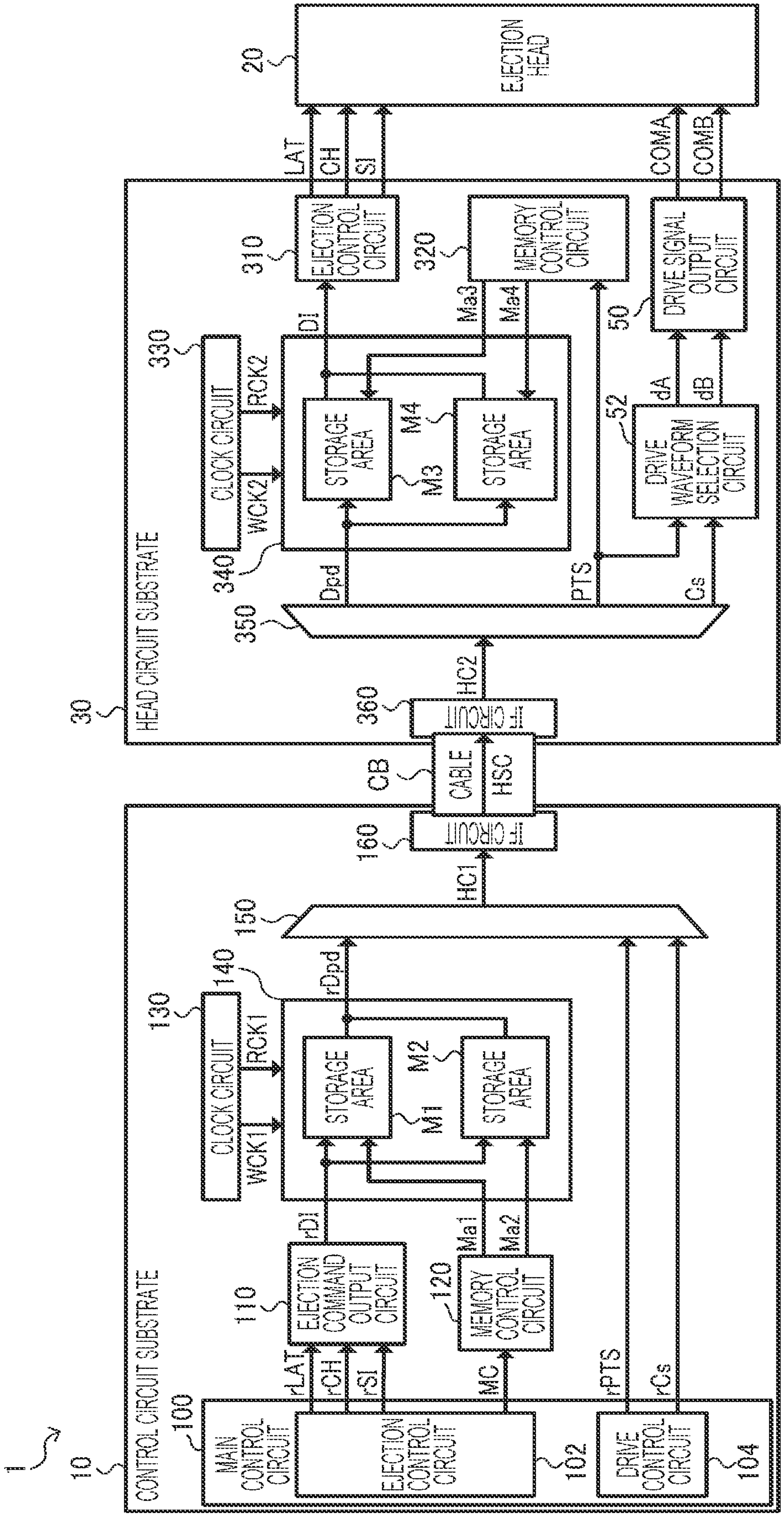
FIG. 1 is a functional block diagram of a liquid ejecting apparatus according to an embodiment of the present disclosure.

FIG. 1 is a functional block diagram of a liquid ejecting apparatus 1. As illustrated in FIG. 1, the liquid ejecting apparatus 1 includes a control circuit substrate 10, a head circuit substrate 30, an ejection head 20, and a cable CB that couples the control circuit substrate 10 and the head circuit substrate 30.

The control circuit substrate 10 includes a main control circuit 100, an ejection command output circuit 110, a memory control circuit 120, a clock circuit 130, dual port random-access memory (RAM) 140, a multiplexer 150, and an interface (IF) circuit 160. In this case, the control circuit substrate 10 is formed of one or more wiring substrates (not illustrated) on which all of the main control circuit 100, the ejection command output circuit 110, the memory control circuit 120, the clock circuit 130, the dual port RAM 140, the multiplexer 150, and the IF circuit 160 are mounted. In short, the control circuit substrate 10 may be formed of a single wiring substrate on which all of the main control circuit 100, the ejection command output circuit 110, the memory control circuit 120, the clock circuit 130, the dual port RAM 140, the multiplexer 150, and the IF circuit 160 are mounted or may be formed of two wiring substrates: a first substrate on which some of them are mounted; and a second substrate in which the others are mounted.

The main control circuit 100 generates control signals for use in controlling individual sections in the liquid ejecting apparatus 1, based on image data received from an external apparatus (not illustrated), such as a host computer. The main control circuit 100 then outputs these control signals. In this case, the main control circuit 100 includes an ejection control circuit 102 and a drive control circuit 104.

The ejection control circuit 102 in the main control circuit 100 generates a plurality of signals, based on which an image is to be formed on a medium and then outputs these signals to the ejection command output circuit 110; the signals are used to control discharging of liquid from the ejection head 20 (described later), such as a discharge timing of the liquid and the amount of the liquid to be discharged. More specifically, the ejection control circuit 102 generates a latch signal rLAT and a change signal rCH that both specify the discharge timing of the liquid and a print data signal rSI that specifies the amount of the liquid to be discharged and then outputs all of the latch signal rLAT, the change signal rCH, and the print data signal rSI to the ejection command output circuit 110. In addition to the latch signal rLAT, the change signal rCH, and the print data signal rSI, the ejection control circuit 102 may also output a forced ejection signal for use in forcing the ejection head 20 to discharge the liquid and a check signal for use in checking the state of the ejection head 20.

When receiving the latch signal rLAT, the change signal rCH, and the print data signal rSI from the main control circuit 100, the ejection command output circuit 110 generates an ejection command signal rDI and then outputs the ejection command signal rDI to the dual port RAM 140; the ejection command signal rDI contains the latch signal rLAT and the change signal rCH, both of which are signals based on which the image is to be formed on a medium, and an ejection command specified by the print data signal rSI. Details of the ejection command signal rDI will be described later.

In parallel with the above, the ejection control circuit 102 also generates a memory control signal MC and then outputs the memory control signal MC to the memory control circuit 120. When receiving the memory control signal MC, the memory control circuit 120 generates a memory control signal Ma1 and a memory control signal Ma2, based on the memory control signal MC and then outputs the memory control signals Ma1 and Ma2 to the dual port RAM 140; the memory control signals Ma1 and Ma2 are used to control writing of data into the dual port RAM 140 and reading of data from the dual port RAM 140. In short, the ejection control circuit 102 and the memory control circuit 120 cooperate to control the dual port RAM 140.

The clock circuit 130 generates a clock signal WCK1 and a clock signal RCK1 and then outputs both the clock signal WCK1 and the clock signal RCK1 to the dual port RAM 140. In this case, the frequency of the clock signal RCK1 is higher than the frequency of the clock signal WCK1.

The dual port RAM 140 receives the ejection command signal rDI from the ejection command output circuit 110, both the memory control signals Ma1 and Ma2 from the memory control circuit 120, and the clock signals WCK1 and RCK1 from the clock circuit 130.

The dual port RAM 140 includes a storage area M1 and a storage area M2.

The storage area M1 is supplied with both the ejection command signal rDI from the ejection command output circuit 110 and the memory control signal Ma1 from the memory control circuit 120. When the memory control signal Ma1 controls writing of data into the storage area M1, the ejection command signal rDI is written into the storage area M1 in accordance with the clock signal WCK1. When the memory control signal Ma1 controls reading of data from the storage area M1, data that has been written into the storage area M1 is read therefrom in accordance with the clock signal RCK1.

The storage area M2 is supplied with the ejection command signal rDI from the ejection command output circuit 110 and the memory control signal Ma2 from the memory control circuit 120. When the memory control signal Ma2 controls writing of data into the storage area M2, the ejection command signal rDI is written into the storage area M2 in accordance with the clock signal WCK1. When the memory control signal Ma2 controls reading of data from the storage area M2, data that has been written into the storage area M2 is read therefrom in accordance with the clock signal RCK1.

As described above, the dual port RAM 140 writes the ejection command signal rDI that has been received from the ejection command output circuit 110 into one of the storage areas M1 and M2 at a frequency specified by the clock signal WCK1. In addition, the dual port RAM 140 reads data from the other of the storage areas M1 and M2 in accordance with the clock signal RCK1, the frequency of which is higher than the frequency of the clock signal WCK1. In the dual port RAM 140, each of the storage areas M1 and M2 can function as a buffer circuit that temporarily stores the ejection command signal rDI and also functions as a frequency conversion circuit that converts the frequency of the ejection command signal rDI from the frequency specified by the clock signal WCK1 into the frequency specified by the clock signal RCK1, which is higher than the frequency specified by the clock signal WCK1 and then outputting the resultant signal as the base ejection data signal rDpd.

The dual port RAM 140 outputs, to the multiplexer 150, the base ejection data signal rDpd containing data that has been read from both the storage areas M1 and M2.

As described above, the dual port RAM 140 includes the storage areas M1 and M2, each of which functions as the buffer circuit. The dual port RAM 140 can simultaneously write data contained in the ejection command signal rDI into the storage area M1 and read data contained in the ejection command signal rDI from the storage area M2. Likewise, the dual port RAM 140 can also simultaneously read data contained in the ejection command signal rDI from the storage area M1 and write data contained in the ejection command signal rDI into the storage area M2. In short, when outputting the memory control signal Ma1 that controls writing of data to the storage area M1, the memory control circuit 120 outputs the memory control signal Ma2 that controls reading of data to the storage area M2. When outputting the memory control signal Ma1 that controls reading of data to the storage area M1, the memory control circuit 120 also outputs the memory control signal Ma2 that controls writing of data to the storage area M2.

The drive control circuit 104 in the main control circuit 100 outputs a waveform selection signal rCs and a period signal rPTS to the multiplexer 150. Both the waveform selection signal rCs and the period signal rPTS are used to control individual sections of the liquid ejecting apparatus 1 so as to form an image on a medium. More specifically, the waveform selection signal rCs selects any one of the waveforms of drive signals COMA and COMB for use in driving a plurality of drive elements in the ejection head 20, whereas the period signal rPTS specifies the drive period of the liquid ejecting apparatus 1. In short, the drive control circuit 104 outputs both the waveform selection signal rCs and the period signal rPTS for use in controlling at least one of the ejection head 20 and the head circuit substrate 30. In addition to both the waveform selection signal rCs and the period signal rPTS, the drive control circuit 104 may further output signals for use in controlling the driving of the individual sections in the liquid ejecting apparatus 1, such as signals for use in controlling the driving of a motor (not illustrated) and the access to a storage circuit (not illustrated) in the liquid ejecting apparatus 1.

The multiplexer 150 multiplexes the base ejection data signal rDpd, the waveform selection signal rCs, and the period signal rPTS to generate a head control signal HC1 and then outputs the head control signal HC1 to the IF circuit 160. More specifically, the multiplexer 150 selects the period signal rPTS as the head control signal HC1. After that, the multiplexer 150 selects the base ejection data signal rDpd as the head control signal HC1 over the duration in which the dual port RAM 140 is outputting the base ejection data signal rDpd, whereas the dual port RAM 140 selects the waveform selection signal rCs as the head control signal HC1 over the duration in which the dual port RAM 140 does not output the base ejection data signal rDpd. Optionally, the multiplexer 150 receives, as a selection control signal, a Busy signal indicating whether the dual port RAM 140 is outputting the base ejection data signal rDpd and then performs the selection operation in accordance with this Busy signal.

A component that outputs the head control signal HC1 is not limited to the multiplexer 150. Alternatively, this component may sequentially select the base ejection data signal rDpd, the waveform selection signal rCs, and the period signal rPTS and then output the head control signal HC1 containing the base ejection data signal rDpd, the waveform selection signal rCs, and the period signal rPTS in serial order. In this case, the control circuit substrate 10 may include a command queuing circuit, instead of or in addition to the multiplexer 150.

When receiving the head control signal HC1 from the multiplexer 150, the IF circuit 160 converts the head control signal HC1 into a high-speed communication signal HSC and then outputs the high-speed communication signal HSC to the head circuit substrate 30. In short, the IF circuit 160 outputs the high-speed communication signal HSC containing the base ejection data signal rDpd, the waveform selection signal rCs, and the period signal rPTS in serial order. This configuration allows the control circuit substrate 10 to communicate with the head circuit substrate 30 via a cable CB containing a small number of signal lines, thereby reducing the risk of skew or crosstalk arising in the high-speed communication signal HSC.

The high-speed communication signal HSC into which the IF circuit 160 configured above converts the head control signal HC1 may be a low voltage signaling (LVDS) signal or a PCI Express signal. In addition, the high-speed communication signal HSC into which the IF circuit 160 converts the head control signal HC1 may be an optical signal. If the IF circuit 160 converts the head control signal HC1 into the high-speed communication signal HSC in an optical form, it is possible to reduce latency arising in the high-speed communication signal HSC and to further reduce the risk of skew or crosstalk arising in the high-speed communication signal HSC.

The cable CB, which couples the control circuit substrate 10 and the head circuit substrate 30, may be an optical communication cable, such as an optical fiber. In this case, the IF circuit 160 may convert the high-speed communication signal HSC into an optical signal. This configuration can reduce latency arising in the high-speed communication signal HSC and further reduce the risk of skew or crosstalk arising in the high-speed communication signal HSC. Consequently, it is possible to precisely transmit the high-speed communication signal HSC from the control circuit substrate 10 to the head circuit substrate 30.

The head circuit substrate 30 includes an ejection control circuit 310, a memory control circuit 320, a clock circuit 330, a dual port RAM 340, a demultiplexer 350, an IF circuit 360, a drive waveform selection circuit 52, and a drive signal output circuit 50. In this case, the head circuit substrate 30 is formed of one or more wiring substrates (not illustrated) on which the ejection control circuit 310, the memory control circuit 320, the clock circuit 330, the dual port RAM 340, the demultiplexer 350, the IF circuit 360, the drive waveform selection circuit 52, and the drive signal output circuit 50 are all mounted. In short, the head circuit substrate 30 may be formed of a single wiring substrate on which all of the ejection control circuit 310, the memory control circuit 320, the clock circuit 330, the dual port RAM 340, demultiplexer 350, the IF circuit 360, the drive waveform selection circuit 52, and the drive signal output circuit 50 are mounted or may be formed of two wiring substrates: a first substrate on which some of them are mounted; and a second substrate in which the others are mounted.

When receiving the high-speed communication signal HSC from the control circuit substrate 10, the IF circuit 360 restores the high-speed communication signal HSC to generate a head control signal HC2 in relation to the head control signal HC1. The IF circuit 360 then outputs the head control signal HC2 to the demultiplexer 350.

When receiving the head control signal HC2 from the IF circuit 360, the demultiplexer 350 demultiplexes the head control signal HC2 to separate the head control signal HC2 into a base ejection data signal Dpd, a waveform selection signal Cs, and a period signal PTS. The demultiplexer 350 then outputs the base ejection data signal Dpd to the dual port RAM 340, the waveform selection signal Cs to the drive waveform selection circuit 52, and the period signal PTS to both the memory control circuit 320 and the drive waveform selection circuit 52.

Both the IF circuit 360 and the demultiplexer 350 cooperate to convert the high-speed communication signal HSC received from the control circuit substrate 10 into the base ejection data signal Dpd, the waveform selection signal Cs, and the period signal PTS.

When receiving the period signal PTS from the demultiplexer 350, the memory control circuit 320 controls writing/reading of data into or from the dual port RAM 340, based on the period signal PTS. In short, the memory control circuit 320 controls the dual port RAM 340. More specifically, the memory control circuit 320 generates a control signal Ma3 and a control signal Ma4 in accordance with a timing specified by the received period signal PTS and then outputs the memory control signals Ma3 and Ma4 to the dual port RAM 340.

The clock circuit 330 generates a clock signal WCK2 and a clock signal RCK2 and then outputs the clock signal WCK2 and the clock signal RCK2 to the dual port RAM 340. In this case, the frequency of the clock signal RCK2 is lower than the frequency of the clock signal WCK2. Further, the frequency of the clock signal WCK2 output from the clock circuit 330 is substantially equal to the frequency of the clock signal RCK1 output from the clock circuit 130 in the control circuit substrate 10; likewise, the frequency of the clock signal RCK2 output from the clock circuit 330 is substantially equal to the frequency of the clock signal WCK1 output from the clock circuit 130 in the control circuit substrate 10. The expression "frequencies are substantially equal" may imply not only a case where they are completely equal but also a case where they can be regarded as being equal in consideration of their tolerances and variations.

The dual port RAM 340 receives the base ejection data signal Dpd from the demultiplexer 350, both the memory control signals Ma3 and Ma4 from the memory control circuit 320, and both the clock signals WCK2 and RCK2 from the clock circuit 330. The dual port RAM 340 includes a storage area M3 and a storage area M4.

Both the base ejection data signal Dpd output from the demultiplexer 350 and the memory control signal Ma3 output from the memory control circuit 320 are supplied to the storage area M3. When the memory control signal Ma3 controls writing of data into the storage area M3, the base ejection data signal Dpd is written into the storage area M3 in accordance with the clock signal WCK2. When the memory control signal Ma3 controls reading of data from the storage area M3, data that has been written into the storage area M3 is read therefrom in accordance with the clock signal RCK2.

Both the base ejection data signal Dpd output from the demultiplexer 350 and the memory control signal Ma4 output from the memory control circuit 320 are supplied to the storage area M4. When the memory control signal Ma4 controls writing of data into the storage area M4, the base ejection data signal Dpd is written into the storage area M4 in accordance with the clock signal WCK2. When the memory control signal Ma4 controls reading of data from the storage area M4, data that has been written into the storage area M4 is read therefrom in accordance with the clock signal RCK2.

After having read the data from both the storage areas M3 and M4, the dual port RAM 340 outputs the read data to the ejection control circuit 310 as a base ejection command signal DI.

As described above, the dual port RAM 340 includes the storage areas M3 and M4, each of which functions as a buffer circuit. The dual port RAM 340 can simultaneously write data contained in the base ejection data signal Dpd into the storage area M3 and read data contained in the base ejection data signal Dpd from the storage area M4. Likewise, the dual port RAM 340 can simultaneously read data contained in the base ejection data signal Dpd from the storage area M3 and write data contained in the base ejection data signal Dpd from the storage area M4.

When receiving the base ejection command signal DI from the dual port RAM 340, the ejection control circuit 310 generates a latch signal LAT, a change signal CH, and a print data signal SI, the logic levels of which are controlled based on the base ejection command signal DI. The ejection control circuit 310 then outputs all of the latch signal LAT, the change signal CH, and the print data signal SI to the ejection head 20, so that the discharge timing and amount of the liquid can be specified. In short, the ejection control circuit 310 controls operations of the ejection head 20, based on the base ejection command signal DI received from the dual port RAM 340.

The drive waveform selection circuit 52 specifies the waveforms of the drive signals COMA and COMB for use in driving the drive elements in the ejection head 20, based on the waveform selection signal Cs. The waveform selection signal Cs contains information that specifies the waveforms of the drive signals COMA and COMB for use in driving the drive elements.

The drive waveform selection circuit 52 generates a base drive signal dA and a base drive signal dB and then outputs the drive signals dA and dB to the drive signal output circuit 50. The base drive signal dA specifies the waveform of the drive signal COMA, whereas the base drive signal dB specifies the waveform of the drive signal COMB. In this case, the drive waveform selection circuit 52 may include a data table that stores signal waveforms related to the waveform selection signal Cs. When receiving the waveform selection signal Cs, the drive waveform selection circuit 52 may refer to information in the data table based on the waveform selection signal Cs and then output the information as the base drive signals dA and dB.

The drive signal output circuit 50 amplifies the waveform specified by the received base drive signal dA to generate the drive signal COMA and then outputs the drive signal COMA to the ejection head 20. Likewise, the drive signal output circuit 50 amplifies the waveform specified by the received base drive signal dB to generate the drive signal COMB and then outputs the drive signal COMB to the ejection head 20. More specifically, the drive signal output circuit 50 converts the received base drive signal dA into an analog signal, then amplifies this analog signal to generate the drive signal COMA, and outputs the drive signal COMA to the ejection head 20. Likewise, the drive signal output circuit 50 converts the received base drive signal dB into another analog signal, then amplifies this analog signal to generate the drive signal COMB, and outputs the drive signal COMB to the ejection head 20.

The ejection head 20 receives the latch signal LAT, the change signal CH, and the print data signal SI from the dual port RAM 340 and also receives the drive signals COMA and COMB from the drive signal output circuit 50. The ejection head 20 then determines whether to select each of the waveforms of the drive signals COMA and COMB based on the print data signal SI at the timing specified by both the latch signal LAT and the change signal CH, thereby controlling the drive amounts of the drive elements that discharge the liquid. In short, the ejection head 20 adjusts the drive amounts of the drive elements based on the latch signal LAT, the change signal CH, the print data signal SI, and the drive signals COMA and COMB, thereby controlling the discharge amount and timing of the liquid. In this way, a desired image is formed on a medium by the ejection head 20.

2. Functional Configuration of Ejection Head

A description will be given below of a configuration and concrete operation of the ejection head 20 by which the liquid is discharged onto a medium to form a desired image thereon. Prior to the explanation of the configuration and operation of the ejection head 20, an example of the waveforms of the drive signals COMA and COMB supplied to the ejection head 20 will be described below.

Figure 2:
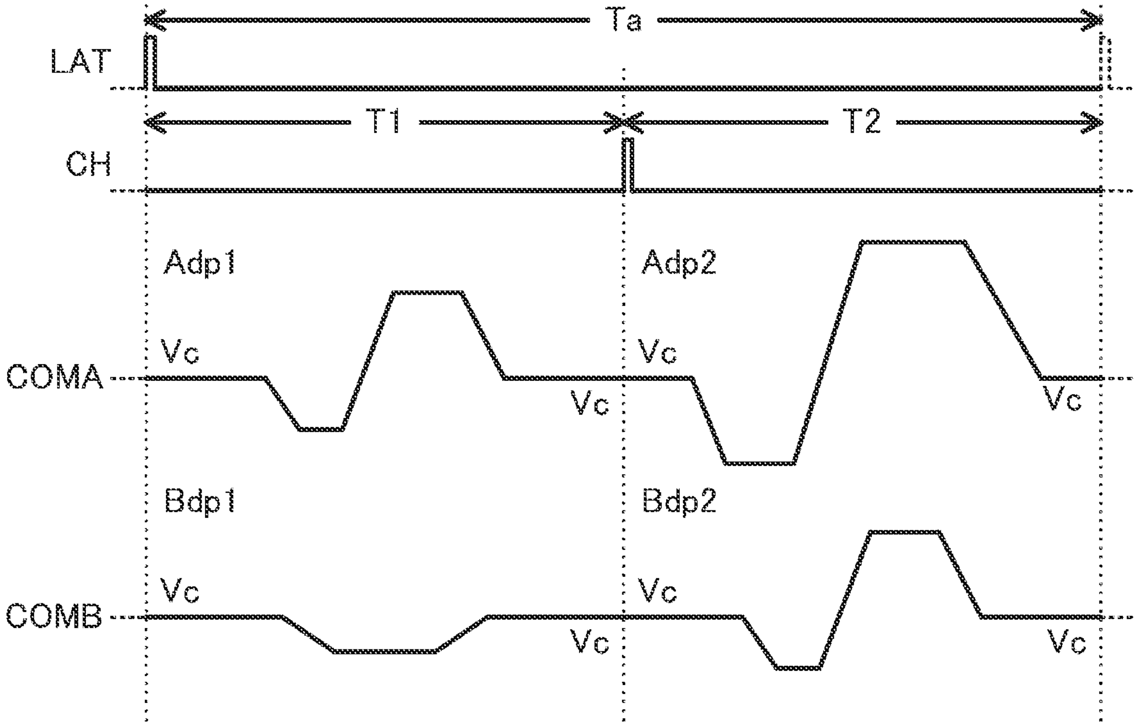
FIG. 2 illustrates an example of the waveforms of drive signals transmitted in the liquid ejecting apparatus.

FIG. 2 illustrates an example of the waveforms of the drive signals COMA and COMB. As illustrated in FIG. 2, the drive signal COMA has a trapezoidal waveform Adp1 and a trapezoidal waveform Adp2 that continuously and periodically appear in this order. More specifically, the trapezoidal waveform Adp1 appears within a duration T1 between the rising edges of the latch signal LAT and the change signal CH; the trapezoidal waveform Adp2 appears within a duration T2 between the rising edges of the change signal CH and the latch signal LAT. The trapezoidal waveform Adp1 is a signal waveform for use in driving a drive element in the ejection head 20 to discharge a predetermined first amount of the liquid, whereas the trapezoidal waveform Adp2 is a signal waveform for use in driving the drive element to discharge a predetermined second amount (>first amount) of the liquid. Hereinafter, the first amount of the liquid discharged upon the supply of the trapezoidal waveform Adp1 to the drive element is sometimes referred to as the small amount, whereas the second amount of the liquid discharged upon the supply of the trapezoidal waveform Adp2 to the drive element is sometimes referred to as the medium amount.

As illustrated in FIG. 2, the drive signal COMB has a trapezoidal waveform Bdp1 and a trapezoidal waveform Bdp2 that continuously and periodically appear in this order. More specifically, the trapezoidal waveform Bdp1 appears within the duration T1; the trapezoidal waveform Adp2 appears within the duration T2. The trapezoidal waveform Bdp1 is a signal waveform for use in driving the drive element to extent that the drive element does not discharge the liquid, whereas the trapezoidal waveform Bdp2 is a signal waveform for use in driving the drive element to discharge a predetermined third amount of the liquid. The words "trapezoidal waveform for use in driving a drive element to the extent that the drive element does not discharge the liquid" mean a signal waveform for use in vibrating only the portion of the drive element near the apertures of the corresponding nozzles so as not to vary the viscosity of the liquid.

As can be seen from FIG. 2, the levels of the trapezoidal waveforms Adp1, Adp2, Bdp1, and Bdp2 at the start and end timings are all equally set to a voltage Vc. In other words, each of the trapezoidal waveforms Adp1, Adp2, Bdp1, and Bdp2 is a signal waveform that starts at the voltage Vc and ends also at the voltage Vc. In this case, a period Ta, which is equal to the total of the duration T1 and the duration T2, corresponds to a print period in which a new dot is to be formed on a medium.

As can be seen from FIG. 2, the shapes of the trapezoidal waveform Adp1 and the trapezoidal waveform Bdp2 coincide with each other. However, the trapezoidal waveform Adp1 and the trapezoidal waveform Bdp2 do not necessarily have to coincide with each other; in other words, they may be different from each other. As described above, when the trapezoidal waveform Adp1 or trapezoidal waveform Bdp2 is supplied to the drive element, the drive element discharges a medium amount of liquid. In this case, however, the drive element does not necessarily have to discharge a medium amount of liquid.

Figure 3:
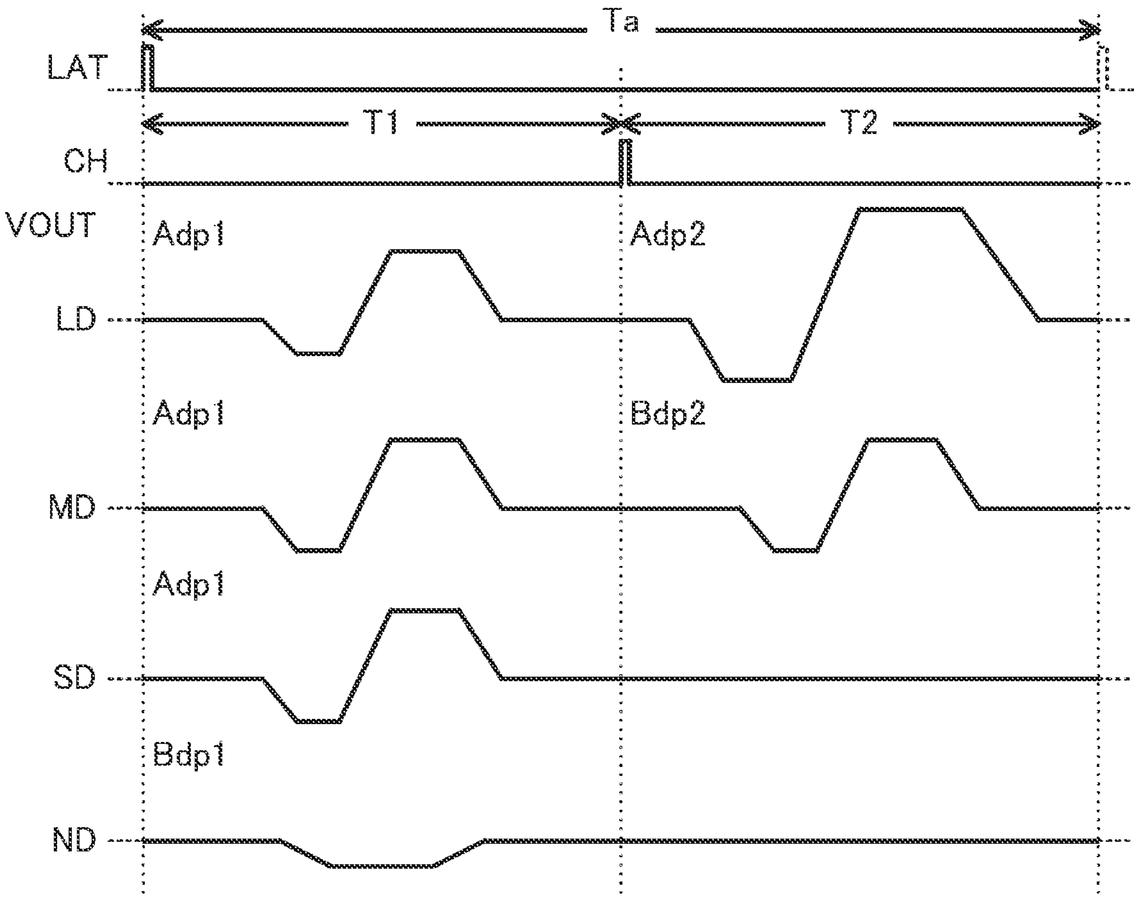
FIG. 3 illustrates an example of the waveforms of other drive signals transmitted in the liquid ejecting apparatus.

Next, a description will be given below of an example of drive signals VOUT generated by selecting or not selecting each of the waveforms of the drive signals COMA and COMB. FIG. 3 illustrates an example of the waveforms of the drive signals VOUT. In FIG. 3, the waveforms of the drive signal VOUT are related to the respective sizes of a dot to be formed on a medium in response to the supply of the drive signals VOUT to the drive elements. More specifically, the waveforms of the drive signals VOUT are related to a large dot LD, a medium dot MD, a small dot SD, and a non-dot (no dots) ND to be formed on the medium.

As can be seen from FIG. 3, when the large dot LD is formed on the medium, the drive signal VOUT has the trapezoidal waveform Adp1 and the trapezoidal waveform Adp2 that continuously and periodically appear, respectively, within the duration T1 and the duration T2 of the period Ta. When this drive signal VOUT is supplied to a drive element in the ejection head 20, a small amount of liquid and a medium amount of liquid are discharged in this order through the corresponding nozzles. As a result, the liquid droplets sequentially land on the medium and are then combined to form the large dot LD over the period Ta.

When the medium dot MD is formed on the medium, the drive signal VOUT has the trapezoidal waveform Adp1 and the trapezoidal waveform Bdp2 that continuously and periodically appear, respectively, within the duration T1 and the duration T2 of the period Ta. When this drive signal VOUT is supplied to a drive element in the ejection head 20, a medium amount of liquid is discharged twice through the corresponding nozzles. As a result, the liquid droplets land on the medium and are combined to form the medium dot MD over the period Ta.

When the small dot SD is formed on the medium, the drive signal VOUT has the trapezoidal waveform Adp1 and the constant-level waveform at the voltage Vc that continuously and periodically appear, respectively, within the duration T1 and the duration T2 of the period Ta. When the drive signal VOUT is supplied to a drive element in the ejection head 20, a small amount of liquid is discharged through the corresponding nozzles. As a result, the liquid droplet lands on the medium to form the small dot SD over the period Ta.

When the non-dot ND is formed on the medium, the drive signal VOUT has the trapezoidal waveform Bdp1 and the constant-level waveform at the voltage Vc that continuously and periodically appear, respectively, within the duration T1 and the duration T2 of the period Ta. When the drive signal VOUT is supplied to a drive element in the ejection head 20, only the portions of the corresponding nozzles near the apertures vibrate to the extent that no liquid is discharged through these nozzles. As a result, no liquid droplets land on the medium over the period Ta, so that no dots are formed thereon.

The expression "the constant-level waveform at the voltage Vc in the drive signal VOUT" means that, when none of the trapezoidal waveforms Adp1, Adp2, Bdp1, and Bdp2 is selected as the drive signal VOUT, a waveform whose level is maintained at the voltage Vc and which appears immediately before the trapezoidal waveform Adp1, Adp2, Bdp1, or Bdp2. In short, when none of the trapezoidal waveforms Adp1, Adp2, Bdp1, and Bdp2 is selected as the drive signal VOUT, the preceding voltage Vc is supplied to a drive element in the ejection head 20 as the drive signal VOUT.

Figure 4:
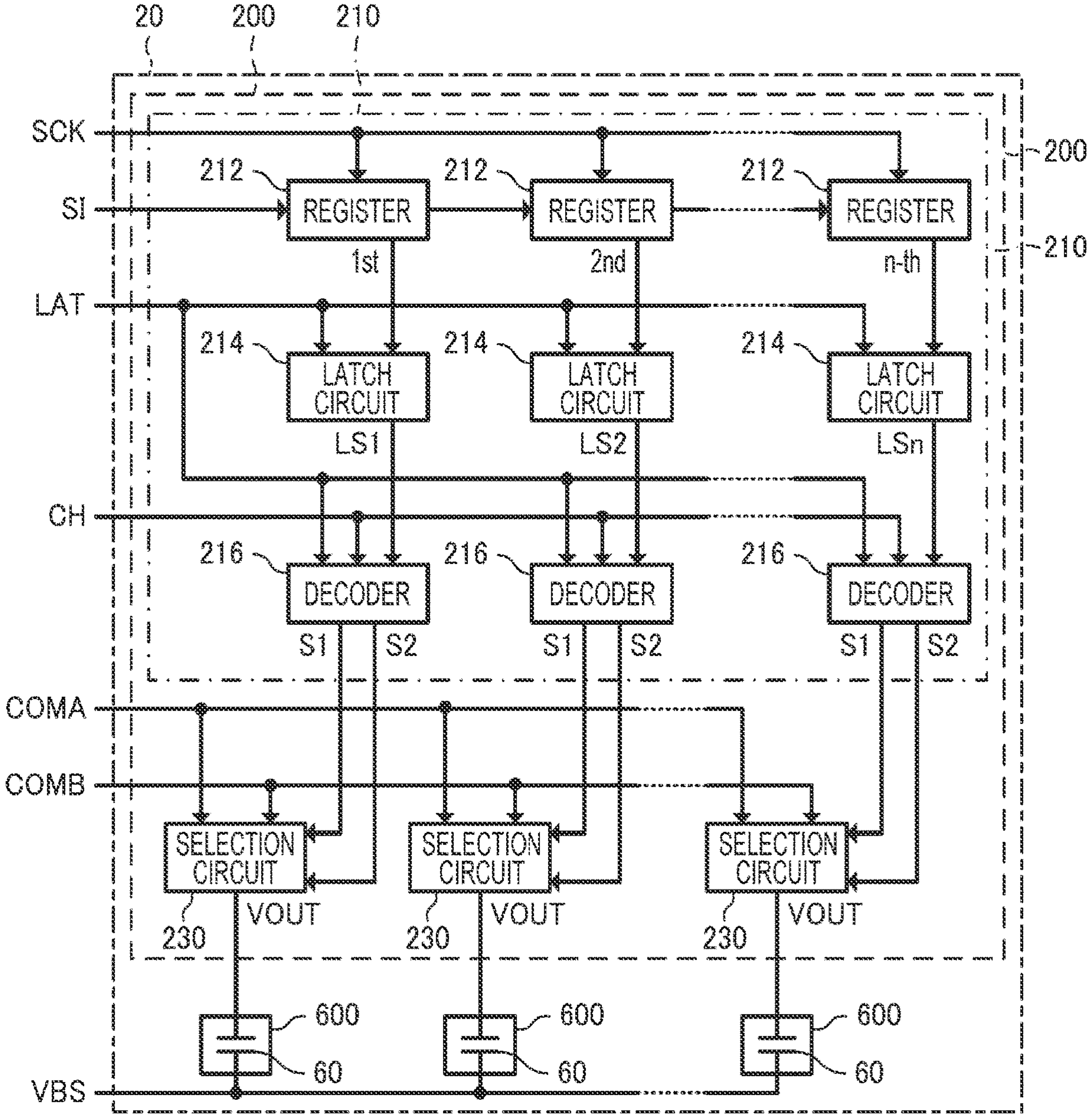
FIG. 4 is a functional block diagram of the ejection head.

Next, the functional configuration of the ejection head 20 will be described below. FIG. 4 is a functional block diagram of the ejection head 20. As illustrated in FIG. 4, the ejection head 20 includes a drive signal selection circuit 200 and an n number of ejection sections 600.

The drive signal selection circuit 200 determines whether to select each of the trapezoidal waveforms Adp1 and Adp2 in the drive signal COMA and the trapezoidal waveforms Bdp1 and Bdp2 in the drive signal COMB, thereby generating the drive signals VOUT for an n number of piezoelectric elements 60, which serve as the respective drive elements. The drive signal selection circuit 200 then applies the drive signals VOUT to the corresponding ejection sections 600.

As illustrated in FIG. 4, the drive signal selection circuit 200 includes a selection control circuit 210 and an n number of selection circuits 230. When the ejection control circuit 310 outputs the print data signal SI, the latch signal LAT, and the change signal CH, all of the print data signal SI, the latch signal LAT, and the change signal CH are supplied to the selection control circuit 210. A clock signal SCK, which is a carrier clock used to carry the print data signal SI, is also supplied to the selection control circuit 210. In this case, the clock signal SCK may be output from an oscillating circuit (not illustrated) or the head circuit substrate 30.

The selection control circuit 210 includes a plurality of groups of a register 212, a latch circuit 214, a decoder 216, which are disposed for the respective ejection sections 600. In this case, the number of groups of the register 212, the latch circuit 214, and the decoder 216 in the selection control circuit 210 coincides with the number of the ejection sections 600.

The print data signal SI is related to each of the individual ejection sections 600. More specifically, the print data signal SI is a total 2n-bit signal that contains multiple pieces of 2-bit print data [SIH, SIL] in serial order, each of which is used to select any one of the large dot LD, the medium dot MD, the small dot SD, and the non-dot ND in accordance with the size of a dot to be formed on a medium. The pieces of print data [SIH, SIL] contained in the print data signal SI in relation to the respective ejection sections 600 are stored in the registers 212.

In the selection control circuit 210, the registers 212 are cascade-connected together to constitute an n-stage shift register. When supplied to the selection control circuit 210 as the print data signal SI, the pieces of the print data [SIH, SIL] are sequentially transmitted to the respective registers 212 in accordance with the clock signal SCK. Once the supply of the clock signal SCK is stopped, the pieces of print data [SIH, SIL] related to the ejection sections 600 are stored in the respective registers 212, which are disposed in relation to the respective ejection sections 600. Hereinafter, the registers 212, which constitute the shift register, are sometimes referred to as the first, second, n-th registers in this order in the traveling direction of the print data signal SI, for the purpose of distinguishing the registers 212 from one another.

An n number of latch circuits 214 are disposed for respective registers 212. The latch circuits 214 latch all the respective pieces of print data [SIH, SIL] stored in the respective registers 212 in response to the rising edges of the latch signal LAT and then output the pieces of print data [SIH, SIL] to the respective decoders 216.

Figures 5, 6:
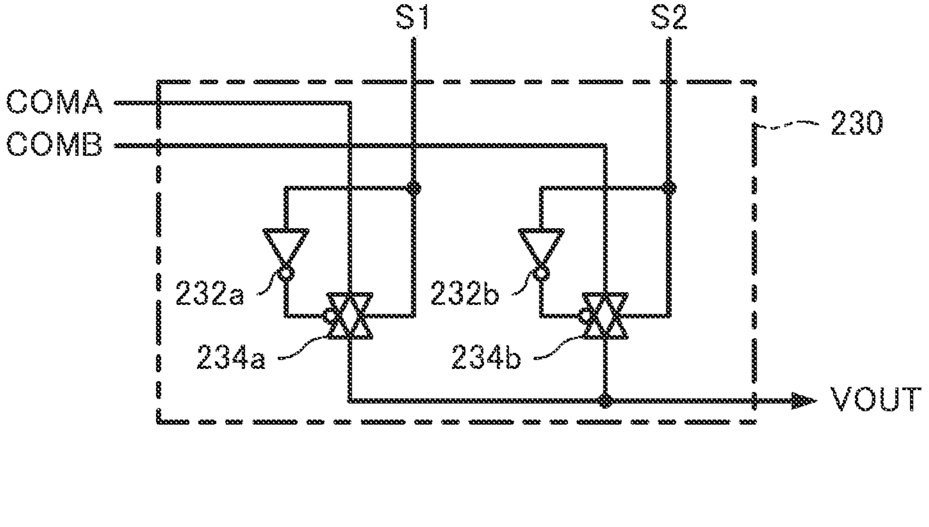
FIG. 5 illustrates an example of decoding results of the decoder.
FIG. 6 illustrates a configuration of the selection circuit related to a single ejection section.

FIG. 5 illustrates an example of decoding results of a decoder 216. The decoders 216 decode the pieces of print data [SIH, SIL] latched by the latch circuits 214 into the results illustrated in FIG. 5, thereby generating and outputting a selection signal S1 and a selection signal S2. For example, when receiving print data [1, 0] as the print data [SIH, SIL], a decoder 216 sets the logic levels of the selection signal S1 in the durations T1 and T2 to H and L, respectively, and then outputs the selection signal S1 to the corresponding selection circuit 230. In addition, the decoder 216 sets the logic levels of the selection signal S2 in the durations T1 and T2 to L and H, respectively, and then outputs the selection signal S2 to the same selection circuit 230.

An n number of selection circuits 230 are disposed for the respective ejection sections 600. The drive signal selection circuit 200 thus includes the same number of selection circuits 230 as that of the ejection sections 600. FIG. 6 illustrates a configuration of the selection circuit 230 related to a single ejection section 600. As illustrated in FIG. 6, the selection circuit 230 includes an inverter 232*a*, an inverter 232*b*, a transfer gate 234*a*, and a transfer gate 234*b*; each of the inverters 232*a* and 232*b* is a NOT circuit.

The selection signal S1 is supplied to the positive control end (not marked with the circle) of the transfer gate 234*a* and also supplied to the inverter 232*a* and then supplied to the negative control end (marked with the circle) of the transfer gate 234*a* after its logic level has been inverted by the inverter 232*a*. In addition, the drive signal COMA is supplied to the input end of the transfer gate 234*a*. Meanwhile, the selection signal S2 is supplied to the positive control end (not marked with the circle) of the transfer gate 234*b* and also supplied to the inverter 232*b* and then supplied to the negative control end (marked with the circle) of the transfer gate 234*b* after its logic level has been inverted by the inverter 232*b*. In addition, the drive signal COMB is supplied to the input end of the transfer gate 234*b*. Furthermore, the output end of the transfer gate 234*a* is commonly coupled to the output end of the transfer gate 234*b*. Thus, a signal at the common node between the output ends of the transfer gate 234*a* and the transfer gate 234*b* is output from the selection circuit 230 as the drive signal VOUT.

More specifically, when the level of the selection signal S1 is H, the conduction is established between the input end and output end of the transfer gate 234*a*; when the level of the selection signal S1 is L, the conduction is not established between the input end and output end of the transfer gate 234*a*. Likewise, when the level of the selection signal S2 is H, the conduction is established between the input end and output end of the transfer gate 234*b*; when the level of the selection signal S2 is L, the conduction is not established between the input end and output end of the transfer gate 234*b*. In this way, the selection circuit 230 switches the conduction state between the input and output ends of each of the transfer gates 234*a* and 234*b*, based on the selection signals S1 and S2, thereby selecting or not selecting each of the waveforms of the drive signals COMA and COMB supplied, respectively, to the input ends of the transfer gates 234*a* and 234*b*. As a result, the drive signal VOUT is generated at the common node between the output ends of the transfer gate 234*a* and the transfer gate 234*b*.

Figure 7:
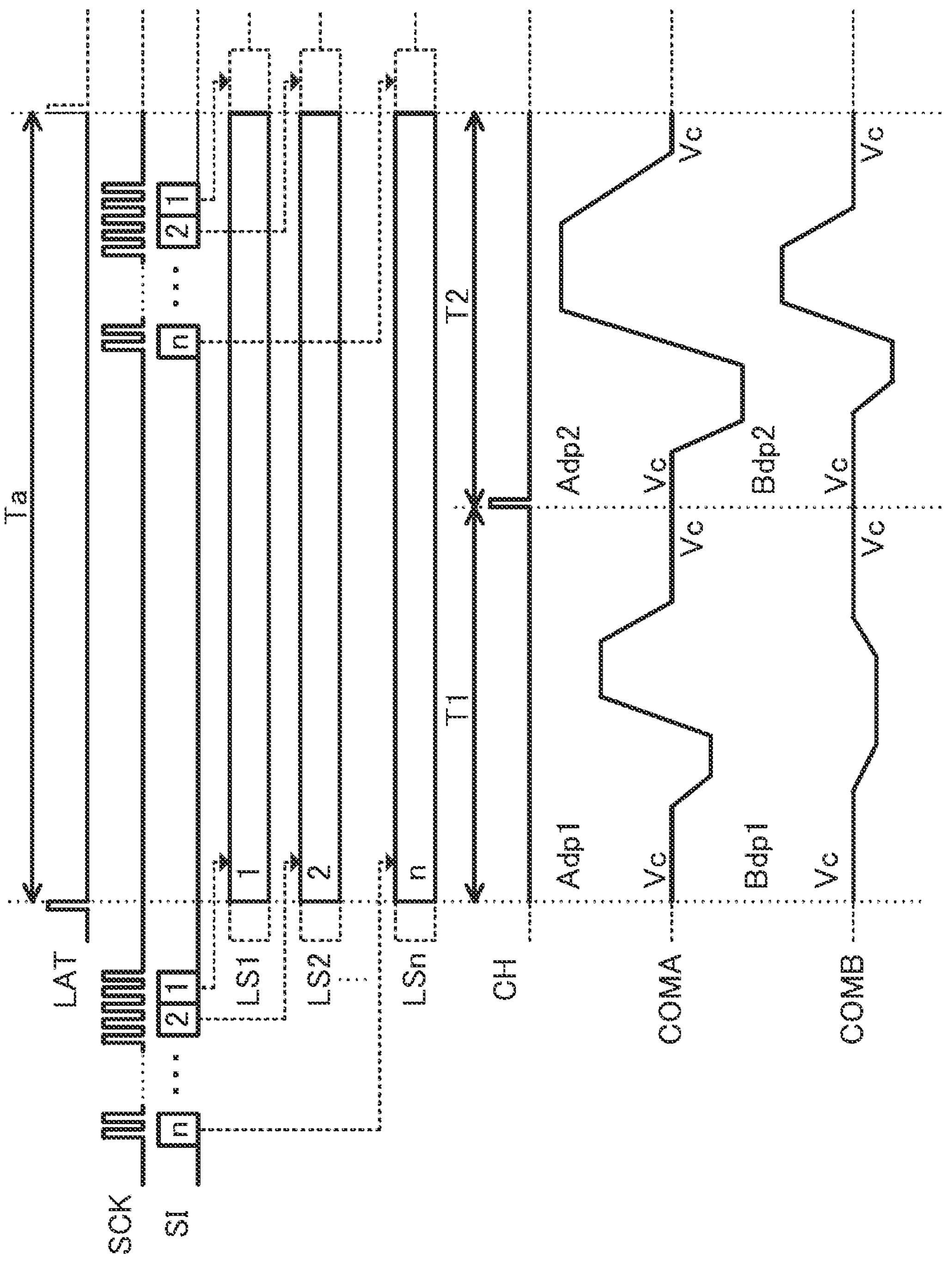
FIG. 7 is a timing chart of the operation of the drive signal selection circuit.

With reference to FIG. 7, the operation of the drive signal selection circuit 200 will be described below. FIG. 7 is a timing chart of the operation of the drive signal selection circuit 200. Multiple pieces of the print data [SIH, SIL] contained in the print data signal SI are supplied in serial order to the drive signal selection circuit 200 in synchronization with the clock signal SCK. Then, the pieces of print data [SIH, SIL] are sequentially transmitted, in synchronization with the clock signal SCK, to the registers 212, which constitute the shift register and are related to the respective ejection sections 600. After that, when the supply of the clock signal SCK is stopped, the pieces of print data [SIH, SIL] are stored in the respective registers 212 related to the ejection sections 600. The pieces of print data [SIH, SIL] contained in the print data signal SI may be sequentially supplied to the respective ejection sections 600 related to the n-th, . . . second, and first registers, which constitute the shift register.

When the latch signal LAT rises, the latch circuits 214 latch all the pieces of print data [SIH, SIL] stored in the registers 212. In FIG. 7, LS1, LS2, . . . LSn denote the respective pieces of print data [SIH, SIL], which are latched by the latch circuits 214 related to the first, second, . . . n-th registers 212.

In the durations T1 and T2, each decoder 216 outputs both the selection signals S1 and S2, the logic levels of which conform to the table of FIG. 5, in accordance with the dot size specified by the latched print data [SIH, SIL].

More specifically, when receiving the print data [SIH, SIL]=[1, 1], a decoder 216 sets the level of the selection signal S1 to H and H in the durations T1 and T2, respectively, and, in turns, sets the level of the selection signal S2 to L and L in the durations T1 and T2, respectively. In this case, the selection circuit 230 selects the trapezoidal waveform Adp1 for the duration T1 and the trapezoidal waveform Adp2 for the duration T2. As a result, the selection circuit 230 generates, at its output end, the drive signal VOUT related to the large dot LD as illustrated in FIG. 3.

When receiving the print data [SIH, SIL]=[1, 0], the decoder 216 sets the level of the selection signal S1 to H and L in the durations T1 and T2, respectively, and, in turn, sets the level of the selection signal S2 to L and H in the durations T1 and T2, respectively. In this case, the selection circuit 230 selects the trapezoidal waveform Adp1 for the duration T1 and the trapezoidal waveform Bdp2 for the duration T2. As a result, the selection circuit 230 generates, at its output end, the drive signal VOUT related to the medium dot MD as illustrated in FIG. 3.

When receiving the print data [SIH, SIL]=[0, 1], the decoder 216 sets the level of the selection signal S1 to H and L in the durations T1 and T2, respectively, and, in turn, sets the level of the selection signal S2 to L and L in the durations T1 and T2, respectively. In this case, the selection circuit 230 selects the trapezoidal waveform Adp1 for the duration T1 and selects neither the trapezoidal waveform Adp2 nor Bdp2 for the duration T2. As a result, the selection circuit 230 generates, at its output end, the drive signal VOUT related to the small dot SD as illustrated in FIG. 3.

When receiving the print data [SIH, SIL]=[0, 0], the decoder 216 sets the level of the selection signal S1 to L and L in the durations T1 and T2, respectively, and, in turn, sets the level of the selection signal S2 to H and L in the durations T1 and T2, respectively. In this case, the selection circuit 230 selects the trapezoidal waveform Bdp1 for the duration T1 and selects neither the trapezoidal waveform Adp2 nor Bdp2 for the duration T2. As a result, the selection circuit 230 generates, at its output end, the drive signal VOUT related to the non-dot ND as illustrated in FIG. 3.

As described above, the drive signal selection circuit 200 selects each of the waveforms of the drive signal COMA and the drive signal COMB, based on the print data signal SI, the clock signal SCK, the latch signal LAT, and the change signal CH, thereby generating and outputting the drive signals VOUT. In this case, each of the print data signal SI, the latch signal LAT, and the change signal CH contains information specifying drive conditions for each drive element.

3. Transmission of Signal in Liquid Ejecting Apparatus

Figure 8:
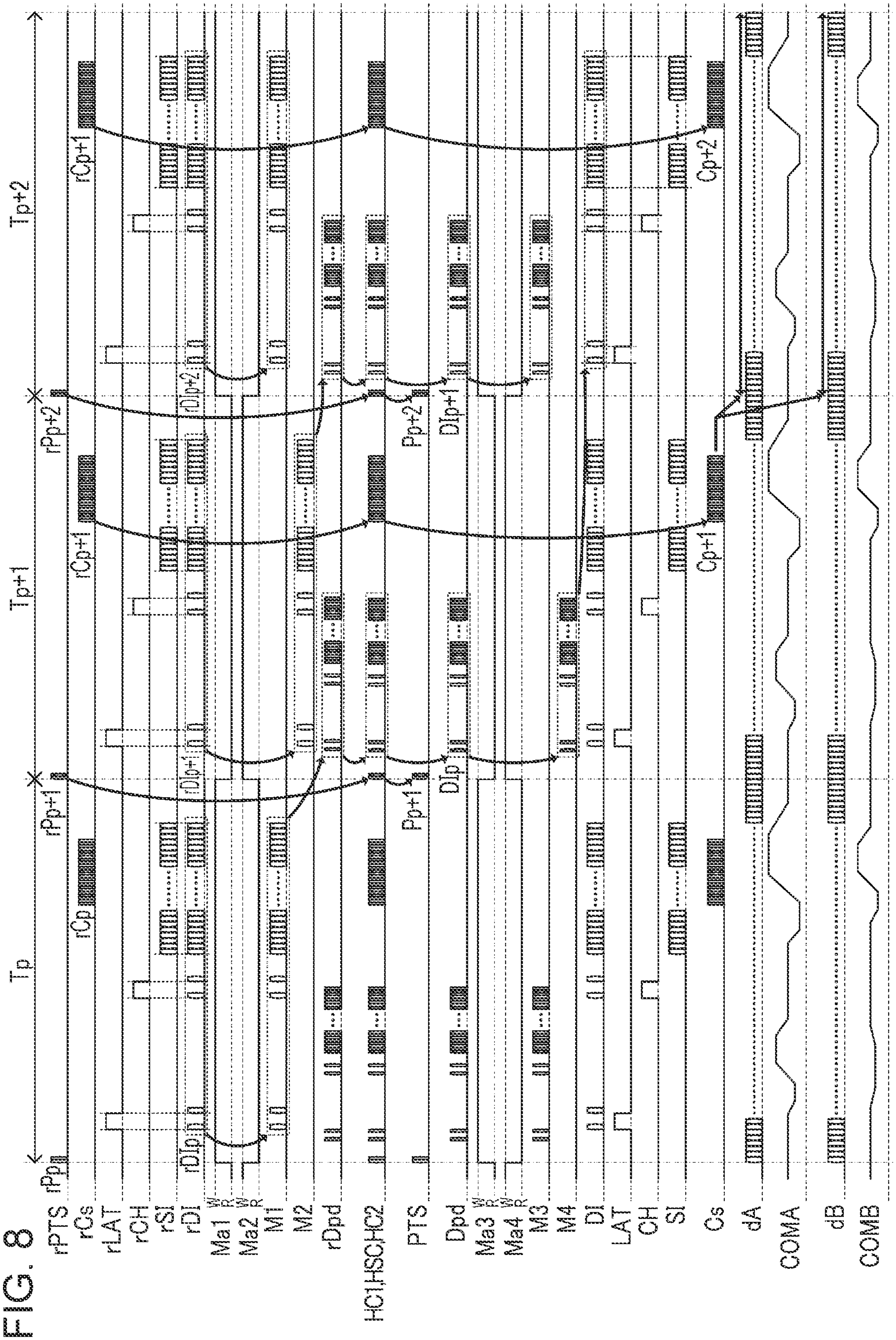
FIG. 8 is a timing chart of the operation of the liquid ejecting apparatus.

A description will be given below of a concrete example of the operation of the liquid ejecting apparatus 1 configured above. FIG. 8 is a timing chart of the operation of the liquid ejecting apparatus 1. In FIG. 8, a predetermined operating period Tp, an operating period (Tp+1) following the operating period Tp, and an operating period (Tp+2) following the operating period (Tp+1) are defined by the period signal rPTS.

The operating period Tp starts in response to the output of period data rPp from the drive control circuit 104 as the period signal rPTS. In the operating period Tp, the ejection control circuit 102 generates the latch signal rLAT, the level of which becomes H in a short time, the change signal rCH, the level of which becomes H in a short time, and the print data signal rSI that contains multiple pieces of print data [SIH, SIL] related to the respective ejection sections 600. The ejection control circuit 102 then outputs the generated latch signal rLAT, change signal rCH, and print data signal rSI to the ejection command output circuit 110. When receiving the latch signal rLAT, the change signal rCH, and the print data signal rSI, the ejection command output circuit 110 generates ejection data rDIp and then outputs the ejection data rDIp to the dual port RAM 140 as the ejection command signal rDI; the ejection data rDIp contains information regarding the rising and falling edges of the latch signal rLAT, the rising and falling edges of the change signal rCH, and the logic levels of the print data [SIH, SIL].

In the operating period Tp, as illustrated in FIG. 8, the memory control circuit 120 outputs the memory control signal Ma1 that controls writing of data in the storage area M1 and the memory control signal Ma2 that controls reading of data from the storage area M2. Thus, in the operating period Tp, the dual port RAM 140 stores the ejection data rDIp received from the ejection command output circuit 110, in the storage area M1 of the dual port RAM 140 in accordance with the clock signal WCK1. In this case, the dual port RAM 140 writes the ejection data rDIp into the storage area M1 at the frequency of the clock signal WCK1.

After the operating period Tp has ended, the operating period (Tp+1) starts in response to the output of period data (rPp+1) from the drive control circuit 104 as the period signal rPTS. In the operating period (Tp+1), similar to the case of the operating period Tp, the ejection control circuit 102 generates the latch signal rLAT, the level of which becomes H in a short time, the change signal rCH, the level of which becomes H in a short time, and the print data signal rSI that contains the print data [SIH, SIL] related to the respective ejection sections 600. The ejection control circuit 102 then outputs the latch signal rLAT, the change signal rCH, and the print data signal rSI to the ejection command output circuit 110. When receiving the latch signal rLAT, the change signal rCH, and the print data signal rSI, the ejection command output circuit 110 generates ejection data (rDIp+1) and then outputs the ejection data (rDIp+1) to the dual port RAM 140 as the ejection command signal rDI; the ejection data (rDIp+1) contains information regarding the rising and falling edges of the latch signal rLAT, the rising and falling edges of the change signal rCH, and the logic level of the print data [SIH, SIL].

In the operating period (Tp+1), as illustrated in FIG. 8, the memory control circuit 120 outputs the memory control signal Ma1 that controls reading of data from the storage area M1 and the memory control signal Ma2 that controls writing of data into the storage area M2. Thus, in the operating period (Tp+1), the dual port RAM 140 stores the ejection data (rDIp+1) received from the ejection command output circuit 110, in the storage area M2 in accordance with the clock signal WCK1. In this case, the dual port RAM 140 writes the ejection data (rDIp+1) into the storage area M2 at the frequency of the clock signal WCK1.

In the operating period (Tp+1), the dual port RAM 140 reads the ejection data rDIp stored in the storage area M1 as the base ejection data signal rDpd in accordance with the clock signal RCK1. In this case, the dual port RAM 140 reads the ejection data rDIp from the storage area M1 at the frequency of the clock signal RCK1.

After having read the ejection data rDIp, the dual port RAM 140 outputs the read ejection data rDIp to the multiplexer 150. In addition, the drive control circuit 104 also outputs period data (rPp+1) and waveform selection data (rCp+1) to the multiplexer 150, respectively, as the period signal rPTS and the waveform selection signal rCs. When receiving the ejection data rDIp, the period data (rPp+1), and the waveform selection data (rCp+1), respectively, as the base ejection data signal rDpd, the period signal rPTS, and the waveform selection signal rCs, the multiplexer 150 sequentially selects the ejection data rDIp, the period data (rPp+1), and the waveform selection data (rCp+1), thereby generating and outputting the head control signal HC1.

More specifically, in the operating period (Tp+1), the multiplexer 150 first selects the period data (rPp+1) as the period signal rPTS and outputs the selected period data (rPp+1) to the IF circuit 160 as the head control signal HC1. The multiplexer 150 then selects the ejection data rDIp as the base ejection data signal rDpd and outputs the selected ejection data rDIp to the IF circuit 160 as the head control signal HC1. After that, the multiplexer 150 selects the waveform selection data (rCp+1) as the waveform selection signal rCs and outputs the selected waveform selection data (rCp+1) to the IF circuit 160 as the head control signal HC1. In short, in the operating period (Tp+1), the multiplexer 150 uses the ejection data rDIp, the period data (rPp+1), and the waveform selection data (rCp+1) to generate the head control signal HC1 that contains the period data (rPp+1), the ejection data rDIp, and the waveform selection data (rCp+1) in serial order. The multiplexer 150 then outputs the generated head control signal HC1 to the IF circuit 160. It should be noted that the order in which the multiplexer 150 selects signals is not limited to the above.

When receiving the head control signal HC1 from the multiplexer 150, the IF circuit 160 converts the head control signal HC1 into the high-speed communication signal HSC. The IF circuit 360 then restores the high-speed communication signal HSC to the head control signal HC2 and outputs the head control signal HC2 to the demultiplexer 350. When receiving the head control signal HC2, the demultiplexer 350 demultiplexes the head control signal HC2 to separate the head control signal HC2 into period data (Pp+1), ejection data DIp, and waveform selection data (Cp+1), which are related, respectively, to the period data (rPp+1), the ejection data rDIp, and the waveform selection data (rCp+1).

The demultiplexer 350 outputs the period signal PTS containing the period data (Pp+1) to the memory control circuit 320. In response, in the operating period (Tp+1), the memory control circuit 320 outputs, to the dual port RAM 340, the memory control signal Ma3 that controls reading of data from the storage area M3 and the memory control signal Ma4 that control writing of data into the storage area M4.

The demultiplexer 350 also outputs the base ejection data signal Dpd containing the ejection data DIp to the dual port RAM 340. As a result, in the operating period (Tp+1), the dual port RAM 340 stores the ejection data DIp contained in the base ejection data signal Dpd, in the storage area M4 in accordance with the clock signal WCK2. In this case, the dual port RAM 340 writes the ejection data DIp into the storage area M4 at the frequency of the clock signal WCK2.

The demultiplexer 350 outputs the waveform selection signal Cs containing the waveform selection data (Cp+1) to the drive waveform selection circuit 52. When receiving the waveform selection signal Cs, the drive waveform selection circuit 52 selects both the base drive signals dA and dB. The base drive signal dA is used to generate the drive signal COMA, the waveform of which is specified by the waveform selection data (Cp+1); the base drive signal dB is used to generate the drive signal COMB, the waveform of which is specified by the waveform selection data (Cp+1). In the operating period (T+2) following the operating period (Tp+1), the drive waveform selection circuit 52 outputs the selected base drive signals dA and dB to the drive signal output circuit 50. When receiving both the base drive signals dA and dB, the drive signal output circuit 50 outputs the drive signals COMA and COMB, the waveforms of which are specified by the base drive signals dA and dB.

After the operating period (Tp+1) has ended, the operating period (Tp+2) starts in response to the output of period data (rPp+2) from the drive control circuit 104 as the period signal rPTS. In the operating period (Tp+2), similar to the case of the operating period (Tp+1), the ejection control circuit 102 generates the latch signal rLAT, the level of which becomes H in a short time, the change signal rCH, the level of which becomes H in a short time, and the print data signal rSI that contains multiple pieces of print data [SIH, SIL] related to the respective ejection sections 600. The ejection control circuit 102 then outputs the latch signal rLAT, the change signal rCH, and the print data signal rSI to the ejection command output circuit 110. When receiving the latch signal rLAT, the change signal rCH, and the print data signal rSI from the ejection control circuit 102, the ejection command output circuit 110 generates ejection data (rDIp+2) and then outputs the ejection data (rDIp+2) to the dual port RAM 140 as the ejection command signal rDI; the ejection data (rDIp+2) contains information regarding the rising and falling edges of the latch signal rLAT, the rising and falling edges of the change signal rCH, and the logic level of the print data [SIH, SIL].

In the operating period (Tp+2), as illustrated in FIG. 8, the memory control circuit 120 outputs the memory control signal Ma1 that controls writing of data into the storage area M1 and the memory control signal Ma2 that controls reading of data from the storage area M2. Thus, in the operating period (Tp+2), the dual port RAM 140 stores the ejection data (rDIp+2) received from the ejection command output circuit 110, in the storage area M1 in accordance with the clock signal WCK1. In this case, the dual port RAM 140 writes the ejection data (rDIp+2) into the storage area M1 at the frequency of the clock signal WCK1.

In the operating period (Tp+2), the dual port RAM 140 reads the ejection data (rDIp+1) that has been stored in the storage area M2 as the base ejection data signal rDpd in accordance with the clock signal RCK1. In this case, the dual port RAM 140 reads the ejection data (rDIp+1) from the storage area M2 at the frequency of the clock signal RCK1.

After having read the ejection data (rDIp+1), the dual port RAM 140 outputs the read ejection data (rDIp+1) to the multiplexer 150. In addition, the drive control circuit 104 also outputs period data (rPp+2) and waveform selection data (rCp+2) to the multiplexer 150, respectively, as the period signal rPTS and the waveform selection signal rCs. When receiving the ejection data (rDIp+1), the period data (rPp+2), and the waveform selection data (rCp+2), respectively, as the base ejection data signal rDpd, the period signal rPTS, and the waveform selection signal rCs, the multiplexer 150 sequentially selects the ejection data (rDIp+1), the period data (rPp+2), and the waveform selection data (rCp+2), thereby generating and outputting the head control signal HC1.

More specifically, in the operating period (Tp+2), the multiplexer 150 first selects the period data (rPp+2) as the period signal rPTS and outputs the selected period data (rPp+2) to the IF circuit 160 as the head control signal HC1. The multiplexer 150 then selects the ejection data (rDIp+1) as the base ejection data signal rDpd and outputs the selected ejection data (rDIp+1) to the IF circuit 160 as the head control signal HC1. After that, the multiplexer 150 selects the waveform selection data (rCp+2) as the waveform selection signal rCs and outputs the selected waveform selection data (rCp+2) to the IF circuit 160 as the head control signal HC1. In short, in the operating period (Tp+2), the multiplexer 150 uses the ejection data (rDIp+1), the period data (rPp+2), and the waveform selection data (rCp+2) to generate the head control signal HC1 that contains the period data (rPp+2), the ejection data (rDIp+1), and the waveform selection data (rCp+2) in serial order. The multiplexer 150 then outputs the generated head control signal HC1 to the IF circuit 160. It should be noted that the order in which the multiplexer 150 selects signals is not limited to the above.

When receiving the head control signal HC1 from the multiplexer 150, the IF circuit 160 converts the head control signal HC1 into the high-speed communication signal HSC. The IF circuit 360 then restores the high-speed communication signal HSC to the head control signal HC2 and outputs the head control signal HC2 to the demultiplexer 350. When receiving the head control signal HC2, the demultiplexer 350 demultiplexes the head control signal HC2 to separate the head control signal HC2 into period data (Pp+2), ejection data (DIp+1), and waveform selection data (Cp+2), which are related, respectively, to the period data (rPp+2), the ejection data (rDIp+1), and the waveform selection data (rCp+2).

The demultiplexer 350 outputs the period signal PTS containing the period data (Pp+2) to the memory control circuit 320. In response, in the operating period (Tp+2), the memory control circuit 320 outputs, to the dual port RAM 340, the memory control signal Ma3 that controls writing of data into the storage area M3 and the memory control signal Ma4 that control reading of data from the storage area M4.

The demultiplexer 350 also outputs the base ejection data signal Dpd containing the ejection data (DIp+1) to the dual port RAM 340. As a result, in the operating period (Tp+2), the dual port RAM 340 stores the ejection data (DIp+1) contained in the base ejection data signal Dpd, in the storage area M3 in accordance with the clock signal WCK2. In this case, the dual port RAM 340 writes the ejection data (DIp+1) into the storage area M3 at the frequency of the clock signal WCK2.

The demultiplexer 350 outputs the waveform selection signal Cs containing the waveform selection data (Cp+2) to the drive waveform selection circuit 52. When receiving the waveform selection signal Cs, the drive waveform selection circuit 52 selects both the base drive signals dA and dB. The base drive signal dA is used to generate the drive signal COMA, the waveform of which is specified by the waveform selection data (Cp+2); the base drive signal dB is used to generate the drive signal COMB, the waveform of which is specified by the waveform selection data (Cp+2). In an operating period (T+3) following the operating period (Tp+2), the drive waveform selection circuit 52 outputs the selected base drive signals dA and dB to the drive signal output circuit 50. When receiving both the base drive signals dA and dB, the drive signal output circuit 50 outputs the drive signals COMA and COMB, the waveforms of which are specified by the base drive signals dA and dB.

In the operating period (Tp+2), the dual port RAM 340 reads the ejection data DIp stored in the storage area M4, as the base ejection command signal DI in accordance with the clock signal RCK2. In this case, the dual port RAM 340 reads the ejection data rDIp from the storage area M4 at the frequency of the clock signal RCK2.

After having read the base ejection command signal DI containing the ejection data DIp, the dual port RAM 340 outputs the base ejection command signal DI to the ejection control circuit 310. When receiving the base ejection command signal DI, the ejection control circuit 310 generates the latch signal LAT, the change signal CH, and the print data signal SI. The latch signal LAT has a waveform that rises based on the information regarding the rising edge of the latch signal rLAT contained in the ejection data DIp and that falls based on the information regarding the falling edge of the latch signal rLAT. The change signal CH has a waveform that rises based on the rising edge of the information regarding the change signal rCH and that falls based on the falling edge of the information regarding the change signal rCH. The print data signal SI conforms to the information regarding the logic level of the print data [SIH, SIL]. The ejection control circuit 310 then outputs all of the latch signal LAT, the change signal CH, and the print data signal SI to the ejection head 20. After that, the ejection head 20 performs the operations illustrated in FIGS. 4 to 7 to generate the drive signals VOUT for the respective ejection sections 600 and then outputs the drive signals VOUT to the ejection sections 600.

According to an embodiment of the present disclosure, as described above, a liquid ejecting apparatus 1 includes a control circuit substrate 10 and a head circuit substrate 30. The control circuit substrate 10 includes an ejection command output circuit 110 that outputs an ejection command signal rDI, based on which an image is to be formed. The control circuit substrate 10 further includes a dual port RAM 140 that includes a storage area M1 and a storage area M2 and that can simultaneously write ejection data (rDIp+1) contained in the ejection command signal rDI into the storage area M2 and read ejection data rDIp contained in the ejection command signal rDI from the storage area M1. The control circuit substrate 10 further includes: a memory control circuit 120 that controls the dual port RAM 140; and an IF circuit 160 that outputs a high-speed communication signal HSC containing the ejection data rDIp to the head circuit substrate 30. Further, the dual port RAM 140 writes the ejection data (rDIp+1) into the storage area M2 at a frequency of the clock signal WCK1 and reads the ejection data (rDIp+1) from the storage area M2 at a frequency of a clock signal RCK1, which is higher than the frequency of the clock signal WCK1. The dual port RAM 140 writes the ejection data rDIp into the storage area M1 at the frequency of the clock signal WCK1 and reads the ejection data rDIp from the storage area M1 at the frequency of the clock signal RCK1.

The head circuit substrate 30 includes an IF circuit 360 and a demultiplexer 350 that corporate to convert a high-speed communication signal HSC received from the control circuit substrate 10 into a base ejection data signal Dpd. The head circuit substrate 30 further includes a dual port RAM 340 that includes a storage area M3 and a storage area M4 and that can simultaneously write ejection data (rDIp+1) contained in the high-speed communication signal HSC into storage area M3 and read ejection data rDIp contained in the high-speed communication signal HSC from the storage area M4. The head circuit substrate 30 further includes: a memory control circuit 320 that controls the dual port RAM 340; and an ejection control circuit 310 that controls the ejection head 20 based on the ejection data rDIp. The dual port RAM 340 writes the ejection data (DIp+1) into the storage area M3 at a frequency of a clock signal WCK2 and reads the ejection data (DIp+1) from the storage area M3 at a frequency of a clock signal RCK2, the frequency of the clock signal WCK2 being substantially equal to the frequency of the clock signal RCK1, the frequency of the clock signal RCK2 being substantially equal to the frequency of the clock signal WCK1. The dual port RAM 340 writes the ejection data rDIp into the storage area M4 at the frequency of the clock signal WCK2 and reads the ejection data rDIp from the storage area M4 at the frequency of the clock signal RCK2, the frequency of the clock signal WCK2 being substantially equal to the frequency of the clock signal RCK1, the frequency of the clock signal RCK2 being substantially equal to the frequency of the clock signal WCK1.

Herein, a high-speed communication signal HSC that contains a latch signal LAT, a change signal CH, and a print data signal SI for use in controlling an ejection head 20 is an example of a head control signal. An ejection command signal rDI is an example of a base image data signal. An ejection command output circuit 110 that outputs the ejection command signal rDI is an example of a base image data output circuit. A storage area M2 is an example of a first buffer; a storage area M1 is an example of a second buffer; a storage area M3 is an example of a third buffer; and a storage area M4 is an example of a fourth buffer. A dual port RAM 140 that includes both the storage areas M2 and M1 is an example of a first buffer circuit; a dual port RAM 340 that includes both the storage areas M3 and M4 is an example of a second buffer circuit. A memory control circuit 120 that controls the dual port RAM 140 is an example of a first buffer control circuit; a memory control circuit 320 that controls the dual port RAM 340 is an example of a second buffer control circuit. Ejection data (rDIp+1) is an example of first image data and first head control data; ejection data rDIp is an example of second image data and second head control data. A configuration that includes an IF circuit 160 and a multiplexer 150 is an example of a control signal output circuit; a configuration that includes an IF circuit 360 and a demultiplexer 350 is an example of a conversion circuit. A frequency of a clock signal WCK1 is an example of a first frequency; a frequency of a clock signal RCK1 is an example of a second frequency; and a base ejection data signal Dpd is an example of an image data signal. At least one of a period signal rPTS and a waveform selection signal rCs for use in controlling the drive of at least one of the ejection head 20 and the head circuit substrate 30 is an example of a drive control signal. A drive control circuit 104 that outputs a waveform selection signal rCs and a period signal rPTS is an example of a drive control signal output circuit.

4. Function and Effect

In a liquid ejecting apparatus 1 according to an embodiment of the present disclosure, a dual port RAM 140 writes ejection data (rDIp+1) into a storage area M2 at a frequency of a clock signal WCK1 and reads the ejection data (rDIp+1) from the storage area M2 at a frequency of a clock signal RCK1, which is higher than the frequency of the clock signal WCK1. Furthermore, the dual port RAM 140 writes ejection data rDIp into a storage area M1 at the frequency of the clock signal WCK1 and reads the ejection data rDIp from the storage area M1 at the frequency of the clock signal RCK1. This configuration can transmit a signal at a high rate from a control circuit substrate 10 to a head circuit substrate 30 without varying the correlation between information contained in the ejection data rDIp and the ejection data (rDIp+1).

The above configuration can reduce the risk that a conversion of a signal being transmitted at a high rate from the control circuit substrate 10 to the head circuit substrate 30 may cause fluctuations between a timing specified by the ejection command signal rDI based on which an image is to be formed and the timing at which both the head circuit substrate 30 and the ejection head 20 are controlled. Consequently, it is possible to precisely discharge liquid from the ejection head 20. For example, if the liquid ejecting apparatus 1 has a large number of nozzles and a large number of drive elements disposed for the nozzles, it is necessary to transmit a signal at a high rate in the liquid ejecting apparatus 1. Even in this case, it is possible to precisely discharge ink from the ejection head 20.

A dual port RAM 340 mounted on the head circuit substrate 30 writes the ejection data (DIp+1) into a storage area M3 at a frequency of a clock signal WCK2 and reads the ejection data (DIp+1) from the storage area M3 at a frequency of a clock signal RCK2, the frequency of the clock signal WCK2 being substantially equal to the frequency of the clock signal RCK1, the frequency of the clock signal RCK2 being substantially equal to the frequency of the clock signal WCK1. Furthermore, the dual port RAM 340 writes the ejection data rDIp into a storage area M4 at the frequency of the clock signal WCK2 and reads the ejection data rDIp from the storage area M4 at the frequency of the clock signal RCK2, the frequency of the clock signal WCK2 being substantially equal to the frequency of the clock signal RCK1, the frequency of the clock signal RCK2 being substantially equal to the frequency of the clock signal WCK1. This configuration can reduce the risk that a conversion of a signal, upon restoration, that has been transmitted to the head circuit substrate 30 may cause fluctuations between a timing specified by the ejection command signal rDI based on which an image is to be formed and the timing at which both the head circuit substrate 30 and the ejection head 20 are controlled. Consequently, it is possible to precisely discharge the liquid from the ejection head 20. For example, if the liquid ejecting apparatus 1 has large a number of nozzles and a number of drive elements disposed for the nozzles, it is necessary to transmit a signal at a high rate in the liquid ejecting apparatus 1. Even in this case, it is possible to further precisely discharge ink from the ejection head 20.

The dual port RAM 140 writes ejection data (rDIp+1) into the storage area M2 at the frequency of the clock signal WCK1 and reads the ejection data (rDIp+1) from the storage area M2 at the frequency of the clock signal RCK1, which is higher than the frequency of the clock signal WCK1. Furthermore, the dual port RAM 140 writes the ejection data rDIp into the storage area M1 at the frequency of the clock signal WCK1 and reads the ejection data rDIp from the storage area M1 at the frequency of the clock signal RCK1. As a result, the dual port RAM 140 converts an ejection command signal rDI into a high-frequency signal. The multiplexer 150 then utilize a frequency band reserved by the conversion from the ejection command signal rDI into the high-frequency signal to transmit signals, such as a waveform selection signal rCs and a period signal rPTS, used to control at least one of the ejection head 20 and the head circuit substrate 30. This configuration can transmit signals between the control circuit substrate 10 and the head circuit substrate 30 through a cable CB containing a small number of signal lines. Consequently, it is possible to reduce the risk of skew or crosstalk arising in a high-speed communication signal HSC.

Some embodiments of the present disclosure and their modifications have been described above; however, the present disclosure is not limited to those embodiments and modifications and may be implemented by various aspects without departing from the spirit of the present disclosure. For example, some of the embodiments and modifications may be combined together as appropriate.

The present disclosure may include a configuration substantially the same as the configuration described above (e.g., a configuration having substantially the same function, method, result, purpose, and/or effect). The present disclosure may also include a configuration described in the embodiments and modifications in which some nonessential components are replaced with others. The present disclosure may also include a configuration that has substantially the same function or effect or can accomplish substantially the same purpose as the foregoing embodiments and modifications. The present disclosure may also include, in addition to the components described in the embodiments and modifications, one or more components known in the related art.

Hereinafter, the following subject matters can be derived from the foregoing embodiment and modifications.

According to an aspect of the present disclosure, a liquid ejecting apparatus includes: an ejection head that discharges liquid by driving a drive element to form an image on a medium; a head circuit substrate that controls the ejection head; a control circuit substrate that outputs a head control signal for use in controlling the ejection head to the head circuit substrate; and a cable that couples the head circuit substrate and the control circuit substrate. The control circuit substrate includes: a base image data output circuit that outputs a base image data signal, based on which the image is formed; a first buffer circuit that includes a first buffer and a second buffer, the first buffer circuit being configured to simultaneously write first image data contained in the base image data signal into the first buffer and read second image data contained in the base image data signal from the second buffer; a first buffer control circuit that controls the first buffer circuit; and a control signal output circuit that outputs the head control signal containing the second image data. The first buffer circuit writes the first image data into the first buffer at a first frequency and reads the first image data from the first buffer at a second frequency, the second frequency being higher than the first frequency. The first buffer circuit writes the second image data into the second buffer at the first frequency and reads the second image data from the second buffer at the second frequency.

In the above liquid ejecting apparatus, the first buffer circuit writes the first image data into the first buffer at the first frequency and reads the first image data from the first buffer at the second frequency, which is higher than the first frequency. In addition, the first buffer circuit writes the second image data into the second buffer at the first frequency and reads the second image data from the second buffer at the second frequency. This configuration can transmit a signal at a high rate from the control circuit substrate to the head circuit substrate without varying the correlation between timings specified by the base image data signal generated by the control circuit substrate. Consequently, it is possible to reduce the risk of fluctuations in the timings specified by the base image data signal and the timing at which the head circuit substrate and the ejection head are controlled, thereby precisely discharging liquid from the ejection head. Therefore, the liquid ejecting apparatus successfully precisely discharges the liquid from the ejection head even if transmitting a signal at a high rate to drive a large number of drive elements.

The first buffer circuit can simultaneously write the first image data contained in the base image data signal into the first buffer and read the second image data contained in the base image data signal from the second buffer. Therefore, the liquid ejecting apparatus successfully transmits a signal at a high rate between the control circuit substrate and the head circuit substrate.

In the liquid ejecting apparatus according to the aspect, the first image data may contain information that specifies a drive condition for the drive element.

In the liquid ejecting apparatus according to the aspect, the control circuit substrate may further include a drive control signal output circuit that outputs a drive control signal for use in controlling driving of at least one of the ejection head and the head circuit substrate. The control signal output circuit may output the head control signal that contains the second image data and the drive control signal in serial order.

The above liquid ejecting apparatus utilizes a frequency band secured for a high-frequency signal to be transmitted between the control circuit substrate and the head circuit substrate to transmit the drive control signal in serial order. This configuration can transmit a plurality of signals through a cable containing a small number of signal lines with a low risk of skew and electrical crosstalk arising between the signals. Consequently, it is possible to precisely discharge liquid from the ejection head.

In the liquid ejecting apparatus according to the aspect, the control signal output circuit may include a multiplexer. The control signal output circuit may output the head control signal by causing the multiplexer to multiplex the second image data and the drive control signal.

The above liquid ejecting apparatus utilizes a frequency band secured for a high-frequency signal to be transmitted between the control circuit substrate and the head circuit substrate to transmit the drive control signal in serial order. This configuration can transmit a plurality of signals through a cable containing a small number of signal lines with a low risk of skew and electrical crosstalk arising between the signals. Consequently, it is possible to precisely discharge liquid from the ejection head.

In the liquid ejecting apparatus according to the aspect, the drive control signal may contain information that specifies a waveform of a drive signal for use in driving the drive element.

In the liquid ejecting apparatus according to the aspect, the drive control signal may contain information that specifies a driving period of at least one of the ejection head and the head circuit substrate.

In the liquid ejecting apparatus according to the aspect, the cable may be an optical communication cable, and the head control signal may be an optical signal.

The above liquid ejecting apparatus can transmit a plurality of signals through the cable containing a small number of signal lines with a low risk of skew and electrical crosstalk arising between the signals. Consequently, it is possible to precisely discharge liquid from the ejection head.

In the liquid ejecting apparatus according to the aspect, the head circuit substrate may include: a conversion circuit that converts the head control signal received from the control circuit substrate into an image data signal; a second buffer circuit that includes a third buffer and a fourth buffer, the second buffer circuit being configured to simultaneously write first head control data contained in the head control signal into the third buffer and read second head control data contained in the head control signal from the fourth buffer; a second buffer control circuit that controls the second buffer circuit; and an ejection control circuit that controls the ejection head, based on the second head control data. The second buffer circuit may write the first head control data into the third buffer at the second frequency and read the first head control data from the third buffer at the first frequency. The second buffer circuit may write the second head control data into the fourth buffer at the second frequency and read the second head control data from the fourth buffer at the first frequency.

In the above liquid ejecting apparatus, the second buffer circuit may write the first head control data into the third buffer at the second frequency and read the first head control data from the third buffer at the first frequency. In addition, the second buffer circuit may write the second head control data into the fourth buffer at the second frequency and read the second head control data from the fourth buffer at the first frequency. This configuration enables the head circuit substrate to restore a signal based on a base image data signal without varying the correlation between timings specified by the base image data signal. Consequently, it is possible to reduce the risk of fluctuations in the timings specified by the base image data signal and the timing at which the head circuit substrate and an ejection head are controlled, thereby precisely discharging liquid from the ejection head. Therefore, the liquid ejecting apparatus successfully precisely discharges the liquid from the ejection head even if transmitting a signal at a high rate to drive a large number of drive elements.

What is claimed is:

1. A liquid ejecting apparatus comprising:

an ejection head that discharges liquid by driving a drive element to form an image on a medium;

a head circuit substrate that controls the ejection head;

a control circuit substrate that outputs a head control signal for use in controlling the ejection head to the head circuit substrate; and a cable that couples the head circuit substrate and the control circuit substrate, wherein the control circuit substrate includes a base image data output circuit that outputs a base image data signal, based on which the image is formed, a first buffer circuit that includes a first buffer and a second buffer, the first buffer circuit being configured to simultaneously write first image data contained in the base image data signal into the first buffer and read second image data contained in the base image data signal from the second buffer, a first buffer control circuit that controls the first buffer circuit, and a control signal output circuit that outputs the head control signal containing the second image data, the first buffer circuit writes the first image data into the first buffer at a first frequency and reads the first image data from the first buffer at a second frequency, the second frequency being higher than the first frequency, and the first buffer circuit writes the second image data into the second buffer at the first frequency and reads the second image data from the second buffer at the second frequency.

2. The liquid ejecting apparatus according to claim 1, wherein the first image data contains information that specifies a drive condition for the drive element.

3. The liquid ejecting apparatus according to claim 1, wherein the control circuit substrate further includes a drive control signal output circuit that outputs a drive control signal for use in controlling driving of at least one of the ejection head and the head circuit substrate, and the control signal output circuit outputs the head control signal that contains the second image data and the drive control signal in serial order.

4. The liquid ejecting apparatus according to claim 3, wherein the control signal output circuit includes a multiplexer, and the control signal output circuit outputs the head control signal by causing the multiplexer to multiplex the second image data and the drive control signal.

5. The liquid ejecting apparatus according to claim 3, wherein the drive control signal contains information that specifies a waveform of a drive signal for use in driving the drive element.

6. The liquid ejecting apparatus according to claim 3, wherein the drive control signal contains information that specifies a driving period of at least one of the ejection head and the head circuit substrate.

7. A liquid ejecting apparatus according to claim 1, wherein the cable is an optical communication cable, and the head control signal is an optical signal.

8. The liquid ejecting apparatus according to claim 1, wherein the head circuit substrate includes a conversion circuit that converts the head control signal received from the control circuit substrate into an image data signal, a second buffer circuit that includes a third buffer and a fourth buffer, the second buffer circuit being configured to simultaneously write first head control data contained in the head control signal into the third buffer and read second head control data contained in the head control signal from the fourth buffer, a second buffer control circuit that controls the second buffer circuit, and an ejection control circuit that controls the ejection head, based on the second head control data, wherein the second buffer circuit writes the first head control data into the third buffer at the second frequency and reads the first head control data from the third buffer at the first frequency, and the second buffer circuit writes the second head control data into the fourth buffer at the second frequency and reads the second head control data from the fourth buffer at the first frequency.

* * * * *